United States Patent
Szabo et al.

(10) Patent No.: US 9,124,528 B2
(45) Date of Patent: Sep. 1, 2015

(54) METHOD AND ARRANGEMENT FOR DATA CLUSTERING

(71) Applicants: Geza Szabo, Kecskemet (HU); Gergely Pongrácz, Budapest (HU); Zoltán Richárd Turányi, Szentendre (HU)

(72) Inventors: Geza Szabo, Kecskemet (HU); Gergely Pongrácz, Budapest (HU); Zoltán Richárd Turányi, Szentendre (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 13/658,031

(22) Filed: Oct. 23, 2012

(65) Prior Publication Data

US 2013/0107715 A1    May 2, 2013

(30) Foreign Application Priority Data

Oct. 24, 2011 (EP) .................................. 11186364

(51) Int. Cl.
| | | |
|---|---|---|
| H04L 12/24 | (2006.01) | |
| H04L 12/26 | (2006.01) | |
| H04L 12/715 | (2013.01) | |
| H04L 12/851 | (2013.01) | |

(52) U.S. Cl.
CPC .............. *H04L 45/46* (2013.01); *H04L 41/145* (2013.01); *H04L 43/0882* (2013.01); *H04L 43/16* (2013.01); *H04L 47/2441* (2013.01)

(58) Field of Classification Search
USPC ......................................................... 370/235
See application file for complete search history.

(56) References Cited

U.S. PATENT DOCUMENTS

| | | | |
|---|---|---|---|
| 7,594,260 B2 | 9/2009 | Porras et al. | |
| 7,664,048 B1 | 2/2010 | Yung et al. | |
| 7,702,806 B2 | 4/2010 | Gil et al. | |
| 7,944,822 B1 | 5/2011 | Nucci et al. | |
| 2002/0038360 A1* | 3/2002 | Andrews et al. | 709/223 |
| 2005/0169179 A1* | 8/2005 | Antal et al. | 370/231 |
| 2006/0123127 A1* | 6/2006 | Littlefield | 709/229 |
| 2006/0146821 A1* | 7/2006 | Singh et al. | 370/390 |
| 2006/0239219 A1 | 10/2006 | Haffner et al. | |

(Continued)

FOREIGN PATENT DOCUMENTS

| | | |
|---|---|---|
| CN | 101594303 A | 12/2009 |
| EP | 1729447 A1 | 12/2006 |
| WO | 2008067758 A1 | 6/2008 |

OTHER PUBLICATIONS

Bernaille, L. et al., "Traffic Classification on the Fly," SIGCOMM Comput. Commun. Rev., 2006, pp. 23-26, vol. 36, No. 2.

(Continued)

*Primary Examiner* — Jenee Williams
(74) *Attorney, Agent, or Firm* — Coats & Bennett, PLLC (57) ABSTRACT

This disclosure relates a method within a network node and a corresponding network node for determining input information for creation of a data traffic clustering model. The method comprises obtaining data descriptors of data flows, wherein the data descriptors describe data of the data flows, and obtaining flow information of the data flows. In addition, the method comprises determining clustering model input information based on the obtained data descriptors and the obtained flow information. One exemplary advantage of the present disclosure is that it allows traffic clustering based solely on packet header information, making the present disclosure appropriate for handling encrypted traffic.

12 Claims, 3 Drawing Sheets

(56) References Cited

U.S. PATENT DOCUMENTS

| | | | |
|---|---|---|---|
| 2008/0019378 A1* | 1/2008 | Hogan | 370/400 |
| 2009/0106839 A1 | 4/2009 | Cha et al. | |
| 2009/0138420 A1 | 5/2009 | Swift et al. | |
| 2010/0071061 A1 | 3/2010 | Crovella et al. | |
| 2010/0110932 A1* | 5/2010 | Doran et al. | 370/254 |
| 2010/0284300 A1* | 11/2010 | Deshpande et al. | 370/253 |
| 2011/0013527 A1* | 1/2011 | Varadarajan et al. | 370/252 |
| 2011/0213738 A1* | 9/2011 | Sen et al. | 706/12 |
| 2012/0214440 A1* | 8/2012 | Zahoor | 455/405 |
| 2012/0284793 A1* | 11/2012 | Steinbrecher et al. | 726/23 |
| 2013/0094511 A1* | 4/2013 | Ning et al. | 370/392 |
| 2013/0100849 A1* | 4/2013 | Szabo et al. | 370/253 |
| 2013/0107715 A1* | 5/2013 | Szabo et al. | 370/235 |
| 2013/0148513 A1* | 6/2013 | Szabo et al. | 370/252 |

OTHER PUBLICATIONS

Bar-Yanai, R. et al., "Realtime Classification for Encrypted Traffic," SEA, 2010, pp. 373-385.

Duffield et al. "Predicting Resource Usage and Estimation Accuracy in an IP Flow Measurement Collection Infrastructure." Oct. 27-29, 2003; pp. 1-13; XP-002350609; Miami Beach, Florida.

Wang et al. "Clustering Data Streams on the Two-Tier Structure." 2004; pp. 416-425; Springer-Verlag, Berlin, Heidelberg.

* cited by examiner

METHOD AND ARRANGEMENT FOR DATA CLUSTERING

RELATED APPLICATIONS

This application claims the benefit under 35 U.S.C. §119 of International Application Number EP 11186364.3 filed on Oct. 24, 2011, the disclosure of which is incorporated herein by reference.

TECHNICAL FIELD

This disclosure pertains in general to the field of clustering, and more particularly to a method and an arrangement for preprocessing of data flow information for data clustering.

BACKGROUND

An in-depth understanding of data profiles of Internet traffic is a challenging task for researchers, and is a requirement for most Internet Service Providers (ISPs). By applying Deep Packet Inspection (DPI) to Internet data traffic, in-depth information of said Internet data traffic is gained. This information is valuable in the quest for profiling networked applications by, for instance, ISPs. Having this information, ISPs may then apply differentiated charging policies, traffic shaping, and offer differentiated quality of service guarantees to selected users or applications.

Critical network services may rely on the inspection of the payload of data packets. Since payload inspection of data is time consuming, payload inspection may not be well suited for real-time data flows.

Looking at structured information found in packet headers provides a fast alternative to payload inspection, and may be well suited for certain use cases, for instance real-time data flows.

Clustering of data within machine learning may be considered to comprise two phases, one training phase and one testing phase.

Figure 1:
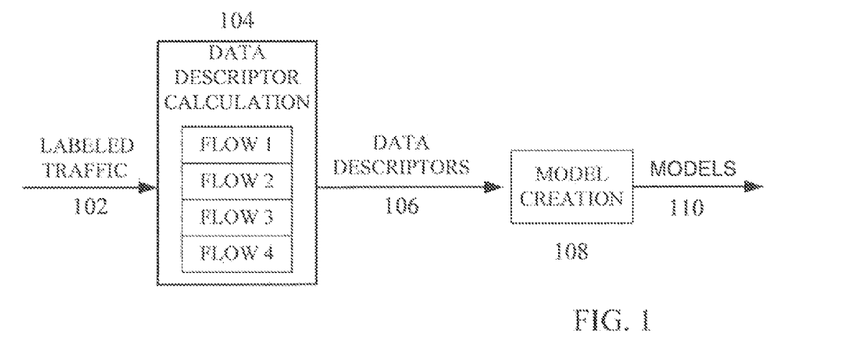
FIGS. 1 and 2 schematically illustrate a known training phase and a known testing phase, respectively, of data clustering within machine.

FIG. 1, schematically presents a known training phase of a clustering method within machine learning. The training phase determines one or more clustering methods based on known data traffic (e.g., labeled data traffic).

The input of the training phase of FIG. 1 is labeled data traffic 102, and the output of said training phase is clustering models 110. The labeled data traffic 102 typically comprises data traffic of known categories, such as peer-to-peer (P2P) and Voice over Internet Protocol (VoIP), to mention two examples only. At 104 descriptors of said data are calculated. Examples of descriptors of said data are average payload size of a data flow and a measure of the distribution of the payload size, such as the deviation of payload size.

From said data descriptors 106, a model creation is then performed at 108, whereby the clustering models 110 are obtained.

These models have thus been calculated to be able to identify the category of data that is input to the training phase of the data clustering. Subsequently, in the testing phase these models will be tested by using unlabeled data traffic.

Figure 2:
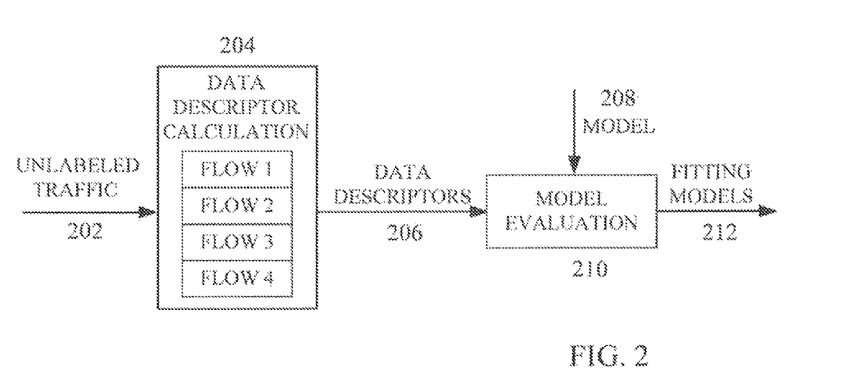

FIG. 2 schematically presents a known testing phase of a clustering method within machine learning. Input to this testing phase is thus unlabeled data traffic 202, that is, data traffic of unknown categories. Output of this testing phase is models having the best fitting to the unlabeled data traffic. The best fitting models will provide a reliable description of the unlabeled data traffic.

At 204 data flows are identified and data descriptors 206 of said flows calculated. Based on said data descriptors 206 and by using available models 208 as obtained from the training phase and loaded into the testing phase, each model is evaluated 210, whereby fitting models 212 may be obtained. Evaluation of each tested method may comprise determination of values of fitting parameters, as a measure of the degree of how well each tested model fits the un-labeled input data traffic.

For instance, the fitting parameters may comprise five fitting parameters that have been determined as exactly as possible along with a confidence interval.

In the field of data clustering or data classification, a huge number of publications are presented. Most publications relate to algorithms that are applied on a flow level, and relatively few relate to algorithms that are applied on a packet level.

"Real-time classification for encrypted traffic", in SEA, 2010, pp. 373-385, Bar-Yanai, R., et al. presents a hybrid clustering method for applications clustered in overlapping clusters by using a k-means measure and a k-nearest neighbor measure.

State-of-the-art model creation methods that operate during data traffic clustering often rely on data clusters that are determined within said method.

Feature reduction algorithms are also known. These are however solely focused on gaining more information.

Although a number of methods have been published, they suffer from different limitations and/or drawbacks.

There is hence a need to overcome said limitations and/or drawbacks of known methods.

SUMMARY

An object of the present disclosure is to provide input information for creation of a data traffic clustering model, solely based on packet header information.

This object is attained by determining said input information based on descriptors of data traffic flows and on data flow information.

According to one aspect of this disclosure, a method in a network node for determining input information for creation of a data traffic clustering model is provided. The data traffic passes the network node and comprises a plurality of data flows, where data categories of said data flows are known. The method comprises obtaining data descriptors of said data flows, where said data descriptors describe physical parameters of said data flows. It also comprises obtaining flow information of said data flows. In addition, it comprises determining clustering model input information based on said obtained data descriptors and said obtained flow information. Determining said clustering model input information further comprises:

determining constraints on data samples from data flows with the same categories, and/or
 selecting a subset of said data descriptors by calculating values of required bandwidths of various processing resources for calculation of said data descriptors, and calculation of values of a content information of the respective data descriptor of each data flow, and comparing these values with bandwidth and content information thresholds, respectively, and selecting said subset of said data descriptors based on said comparison.

The flow information of said data flows, within the method in the network node, may comprise port-related and/or IP address-related flow information of said data flows.

Determining constraints on data samples within the method of the network node may comprise determining constraints on data samples of at least one of:
  data flows that originate from different source IP addresses and are destined for the same destination IP address;
  data flows that originate from the same source IP address and the same source port of said IP address; and
  data flows with different flow information but with the same source IP address.

Constraints determined between data samples from data flows with the same data categories, within the method of the network node, may comprise information obtained from deep packet inspection of said data flows.

Constraints determined between data samples from data flows with the same data categories, within the method of the network node, may comprise data descriptors of said data flows.

The selection of the subset of said data descriptors, within the method of the network node, may be based on the content information comparison, enabling an optimized clustering model accuracy.

The selection of the subset of said data descriptors may be based on the bandwidth comparison, enabling an optimized data profiling processing performance.

Determining clustering model input information, within the method of the network node, may comprise determining user activity information as interpreted by a human expert for defining clusters.

According to another aspect of this disclosure, a network node for determining input information for creation of a data traffic clustering model is provided. The data traffic passes via said network node, where the data traffic comprises data flows and where the categories of said data flows are known. The network node comprises an input port that is configured to obtain flow information of said data flows, and a processor that is configured to obtain data descriptors of said data flows, where said data descriptors describe physical parameters of said data descriptors. The processor is further configured to determine clustering model input information based on said obtained data descriptors of said data flows and said obtained flow information of said data flows. The processor is further configured to:
  determine constraints on data samples from data flows with the same categories, and/or
  select a subset of said data descriptors by calculating values of required bandwidths of various processing resources for calculation of said data descriptors, and calculating values of content information of the respective data descriptor of each data flow, and comparing these values with bandwidth and content information thresholds, respectively, and selecting said subset of said data descriptors based on said comparison.

The input port of the network node for determining input information may be further configured to obtain port-related and/or IP address-related flow information of said data flows.

The processor of the network node for determining input information may be further configured to determine constraints on data samples of at least one of:
  data flows that originate from different source IP addresses and are destined for the same destination IP address;
  data flows that originate from the same source IP address and the same source port of said IP address; and
  data flows with different flow information but with the same source IP address.

The processor of the network node for determining input information may be configured to select the subset of said data descriptors based on the content information comparison, enabling an optimized clustering model accuracy.

The processor of the network node for determining input information is configured to select the subset of said data descriptors based on the bandwidth comparison, enabling an optimized data profiling processing performance.

The network node for determining input information may further comprise an output port that is configured to provide the determined input information from the processor for creation of a data traffic clustering model.

The network node for determining input information for creation of a data traffic clustering model may be any one of a base station, a serving general packet radio service support node, a gateway general packet radio service support node, a broadband remote access server, and a digital subscriber line access multiplexer.

A major advantage of the present disclosure is that it allows traffic clustering solely based on packet header information. This means that the present disclosure is appropriate to handle encrypted traffic.

Embodiments of the present disclosure provide several traffic clustering alternatives, which are provided to improve the accuracy of packet clustering methods that are based on packet headers.

It is advantageous to select features with low processing requirements, since such a selection enables real-time clustering of data traffic.

It is also advantageous for expert or detailed traffic knowledge to be used and incorporated into the present disclosure.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which.

DETAILED DESCRIPTION

As noted above, understanding data profiles of Internet traffic is often a requirement of ISPs.

Knowledge of structured data of data traffic may be useful for differentiated handling of the data, for example in the shaping of data traffic, as well in differentiated charging and in differentiated quality of service that is guaranteed to selected users or applications, to mention a few examples only.

Clustering of data traffic provides a tool towards categorizing the data traffic and understanding the data profiles and the demands that the data traffic makes on the data network.

The present disclosure relates to a training phase of data sample clustering of data traffic.

Figure 3:
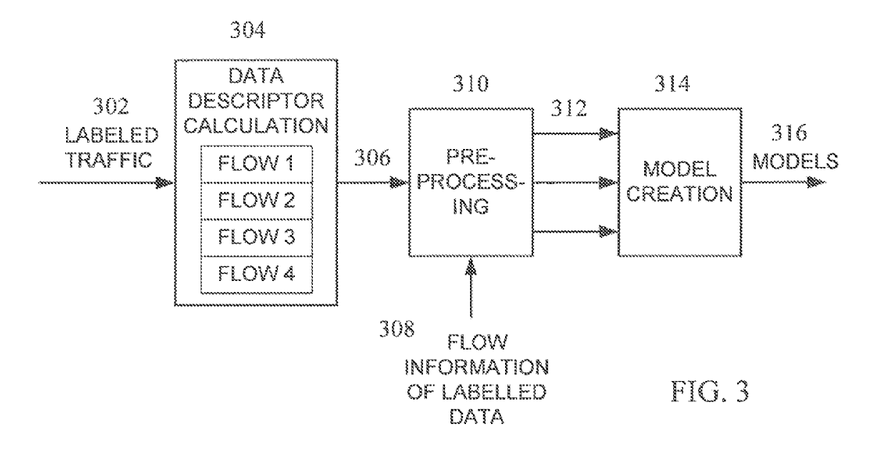
FIG. 3 schematically illustrates a training phase of data clustering according to the present disclosure.

FIG. 3 schematically presents a training phase related to the present disclosure.

The input of this training phase is labeled data traffic 302. As earlier pointed out labeled data traffic refers to data traffic of known data categories. Examples of data categories are Voice over Internet Protocol (VoIP), E-mail and peer-to-peer (P2P).

From the labeled data traffic, data flows may be identified and data descriptors 306 for the calculated data flows calculated. In FIG. 3 an example of identified data flows are denoted by FLOW 1-4. Some example data descriptors may include average payload size of a data flow, and deviation of payload size of a data flow.

Further information that is available on the data traffic relates to information on port-related and IP address-related information of the data flows.

It may be mentioned that a data traffic flow is identified by a 5-tuple that comprises data protocol used, IP address of the source of the data flow, IP address of the destination of the data flow, port used by the data flow at the source, and port to be used by the data flow at the destination of the data flow.

From deep packet inspection, the category of the data flows is obtained. In addition, information on traffic characteristics of data flows may be obtained. An example of traffic characteristics of data flows is the average data throughput. Examples are 0.2; 1; 2 and 5 Mb per second.

In short, information related to which source and destination ports are used, which connection pattern is used, deep packet information and the traffic characteristics are herein together denominated flow information of the data flows.

Preprocessing 310 of the data descriptors is then performed based on flow information of said labeled data. Preprocessing of the data descriptors generates clustering model input information 312 to be used in the model creation 314.

From the model creation 314 clustering models 316 are thus obtained.

It should be clarified that the creation of clustering models, per se, falls beyond the scope of the present disclosure. The focus of the present disclosure is the determination of input information needed for the creation of clustering models for the testing phase.

The present disclosure hence refers to the determination of clustering model input information for the creation of a data traffic clustering model.

Data traffic clustering models are determined during the training phase, based on labeled data, i.e. data flows where the data flows comprise data of known categories, for instance E-mail, P2P, and VoIP.

Figure 4:
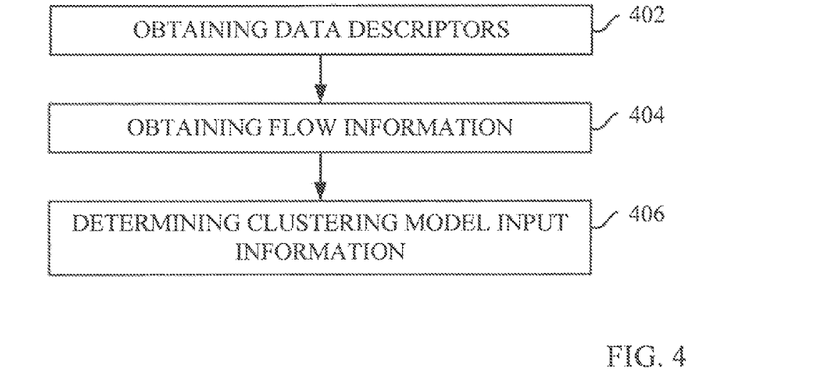
FIG. 4 presents a flowchart of a method according to the present disclosure.

Below a general method in a network node for determining input information for creation of a data traffic clustering model is presented. FIG. 4 discloses a flowchart of the method in a network node for determining input information for creation of a data traffic clustering model. The data traffic passes the network node and comprises a plurality of data flows having data of known categories. The method comprises obtaining (block 402) data descriptors of said data flows, where said data descriptors describe physical parameters of said data flows. The method further comprises obtaining (block 404) flow information of said data flows. In addition, the method comprises determining (block 406) clustering model input information based on said obtained data descriptors and said obtained flow information.

According to some embodiments of the present disclosure determining (block 406) comprises 1) determining constraints on data samples from data flows with the same categories, or 2) selecting a subset of said data descriptors by calculating values of required bandwidths of various processing resources for calculation of said data descriptors, and calculation of values of a content information of the respective data descriptor of each data flow, and comparing these values with bandwidth and content information thresholds, respectively, and selecting said subset of said data descriptors based on said comparison.

According to some embodiments of the present disclosure determining (block 406) comprises 1) determining constraints on data samples from data flows with the same categories, and 2) selecting a subset of said data descriptors by calculating values of required bandwidths of various processing resources for calculation of said data descriptors, and calculation of values of a content information of the respective data descriptor of each data flow, and comparing these values with bandwidth and content information thresholds, respectively, and selecting said subset of said data descriptors based on said comparison.

Data clustering by using constraints (i.e., constrained clustering) is a technique that may be applied to improve clustering. The key idea behind constrained clustering is to define constraints defining which data samples must, or must not, be in one and the same cluster.

In the following, examples of constraints as proposed herein will briefly be described. It is noted that this disclosure comprises MUST-constraints (i.e., constraints of data samples constrained to be within the same cluster). MUST-constraints are chosen in order to avoid constraints that introduce errors in the determination of data clustering. Moreover, only simple heuristics will be used. Introduced MUST-constraints are typically defined between flows with the same category (i.e., with the same label). Before the constraints are disclosed a table of data flows denoted "FLOW 1-6" is presented.

TABLE 1

Survey of determined constraints between different data samples.

| Flow ID | Protocol | srcIP | srcPort | dstIP | dstPort | label | Average throughput (Mbps) | Constraints |
| --- | --- | --- | --- | --- | --- | --- | --- | --- |
| 1 | TCP | A | B | C | D | P2P | 1 | 1--2 |
| 2 | TCP | E | F | C | G | P2P | 1 | |
| 3 | TCP | A | B | H | I | P2P | 2 | 1--3 |
| 4 | TCP | A | B | J | K | P2P | 1 | 1--4 |
| 5 | TCP | A | L | M | N | P2P | 0.2 | 5--6 |
| 6 | TCP | A | L | M | N | P2P | 5 | |

In Table 1 it is noted that each FLOW is characterized by a five-tuple: the protocol, the source IP address, the source port, the destination IP address, and the destination port of each data flow of FLOW 1-6.

The present disclosure comprises a proposal of types constraints of data samples of data flows, with the constraints being defined for data flows around the same time, such as within 5 or 10 minutes.

A first type of constraint may be a constraint between data samples of flows originating from different source IP addresses and going to the same destination IP address. In table 1, element (1,3) and (2,3) indicating the source IP addresses are different, whereas elements (1,5) and (2,5) indicating the destination IP addresses are the same. If it is known that FLOW 1 and FLOW 2 both are categorized as peer-to-peer (P2P), it may be estimated that the two data flows are the same application client, such as Azureus or uTorrent.

A second type of constraint may be a constraint between data samples of flows originating from the same source IP address and from the same source ports. Alternatively, the constraint may be a constraint between data samples of flows to the same destination IP address and to the same destination port.

In Table 1 these elements are (1,3), (3,3) and (4,3); and (1,4), (3,4) and (4,4), for FLOW 1, FLOW 2 and FLOW 3, respectively. Data flows from the same IP port share both application and client program.

A third type of constraints may be a constraint between data samples of flows with significantly different traffic characteristics and with the same source IP address, with different characteristics implying different network conditions. In table 1 these elements are (5,3) and (6,3) for the source IP address; and (5,8) and (6,8) for the characteristics. One example of significantly different traffic characteristics is 0.2 and 5 Mbps of average throughput of two separate data flows of the same category.

It is noted that a priori knowledge of data traffic may be added by forming constraints between different clusters, improving the clustering results. Definition of constraints based on a priori knowledge may hence only be done during the training phase where expert knowledge is available.

Determining of clustering model input information may comprise determining constraints on data samples from data flows of the same category.

The flow information (308) of said data flows may comprise port-related and/or IP address-related flow information of said data flows.

Constraints determined between data samples from data flows with the same data categories may comprise information obtained from deep packet inspection of said data flows.

Constraints determined between data samples from data flows with the same data categories may comprise data descriptors of said data flows.

By applying sets of constraints on data samples from data flows of data traffic, a model for determining input information for the clustering method with improved accuracy is hence provided.

In addition to constrained clustering, data descriptor reduction may be applied to the training phase of data clustering.

Attempting clustering determination is not successful with 300+ data descriptors as the cluster calculation becomes slow and inaccurate. To overcome this problem, the number of data descriptors may have to be reduced.

Within clustering determination the reason that makes one data descriptor more preferred than others is the complexity in calculating them. Some features are simply costly to calculate and require a lot of resources. Other data descriptors may be available for a calculation for free (e.g., thanks to routers providing flow records with volume information).

The present disclosure comprises selecting a subset of said data descriptors by calculating values of required bandwidths of various processing resources for calculation of said data descriptors. Values of content information of the respective data descriptor of each data flow are then calculated. The calculated bandwidth values as well as the calculated values of content information are then compared with respective thresholds. A subset of said data descriptors may then be selected based on said comparisons.

It may be noted that in many practical systems there is a performance budget, that is, the system should be able to sustain X number of flows/sec even at a price of a reduced accuracy.

As a realization of a way to select a subset of data descriptors and cater for performance considerations, a metric-based cost calculation table is introduced. The data descriptors are then selected considering both the common data descriptor selection metrics and the complexity metrics.

To model the data descriptor selection in the metric calculation cost table, data descriptors may be depicted in the diagram as the function of information content and the achievable bandwidth if only that data descriptor is calculated. Different selection strategies may be identified that:
a) aim for maximum accuracy, which requires the selection of the data descriptors with the most information content;
b) aim for maximum performance by selecting those data descriptors for which the calculation cost are minimal.

In practice data descriptor selection is a multidimensional task as the achievable bandwidth depends on the measurement node architecture, like CPU, memory, cache architecture, memory controllers, and instruction set. Even the place of the node in the measurement architecture has high influence factor as acquiring radio level information or Deep Packet Inspection (DPI) from an external node may be very expensive and slow or rather easy as well depending on the system architecture, for example.

It should be noted that there is an optimum value for the number of data descriptors from both an accuracy and a performance point of view. Too many data descriptors reduce both. When selecting data descriptors, the accuracy gain has to be taken into account; and when selecting the extra data descriptor, the calculation cost has to be taken into account.

Two alternative ways of performing a clustering determination when it comes to data descriptor reduction are presented below. One simple method works with a normal limit for average calculation cost in which an algorithm tries to maximize the accuracy between the boundaries set by this limit. By applying a more complex method, however, the accuracy/cost function is maximized.

Existing data descriptor reduction algorithms focuses solely on information gain. They therefore completely neglect other benefits of smart data descriptor selection. By considering reduced CPU occupancy, for instance, higher processing performance may result.

According to some embodiments of the present disclosure determining clustering model input information may also comprise determining a data traffic related constraint.

Data traffic related constraints comprise custom constraints, which correspond to clusters that may be set up by a human expert. The human expert may identify a certain custom descriptor or data related constraint for each data flow. These custom constraints and clusters may be used in addition to other constraints as described herein. The custom constraints may be used to support other clustering or as an input data descriptor for the creation of a clustering model.

Expert knowledge may thus easily be incorporated in the model creation.

The human expert may here define so-called custom descriptors. Custom descriptors are essentially clusters set up by a human expert.

The aim is to define clusters that may be interpreted easily and may help us identify the application that is generating the traffic.

For the human expert it is easy to explain why a flow happens to have a certain custom descriptor. Using this knowledge something may be said about an unknown protocol. These clusters may be used in parallel with automatic machine learning methods to support each other's result, or the custom descriptors can be an input as a data descriptor for the automatic methods.

Within the present disclosure a single custom descriptor or constraint describing an application causing the data traffic may be defined. The custom constraint may be described by the following:

The data flow custom descriptor may be "greedy download" that is characterized by high average packet size down and by low packet size down variance. Since the maximum transmission unit, that is the maximal length of a message sent on the Internet, may vary, it may be defined that a flow belongs to a greedy download if the average down packet size is close to a known maximal transmission unit and the variance of packet destination is small. For instance: Average packet down >1300, average packet up <70.

Peer-to-peer traffic is difficult to characterize because data descriptors highly depend on the number of peers and seeders (i.e., other user's traffic characteristics). If two IP addresses connect by using both TCP and UDP flows then those flows almost surely represent P2P traffic. Typically long lasting flows (e.g., lasting more than 10 minutes), are generated by P2P applications. Furthermore, a big ratio of short flows also belongs to the P2P traffic category.

Traffic generated by media coder-decoders can be identified by its almost constant bitrate, so that variance of packet down is small. For example, the average packet size of a YouTube-generated codec traffic is 200 bytes. For instance, 180<the average packet down <220, variance of packet down <100.

During Chat small packets are exchanged. Since messages are read and typed by humans, packet inter-arrival times are often quite high. Some 95% of packets are smaller than 550 bytes, and port No. 1863 is used by MSN application and that some 10% of packets with size of 50 bytes are generated by MSN. For instance, average inter arrival time down >5, average inter arrival time up >5, average packet down <100, average packet up <100, and number of packet above 550 bytes.

In case of gaming, the average packet size is mainly influenced by the number of players.

The bandwidth of a progressive download is like the one of a greedy download in the beginning of the connection and then it decreases. For instance more than 90% of packets are bigger than 1400 bytes.

Handshake traffic comprises only a few small packets and typically little data is transferred. For instance, packet down >0, packet up >0, and bytes down <2000.

Port Scan is a one-directional traffic that comprises only a few packets. For instance, packet down=0, or packet up=0.

Streaming is very similar to greedy download, but it contains only a few acknowledgements, and the direction of traffic changes only a few times. Now, we try to describe meta-clusters with thresholds. For instance, average packet down>1300, and average packet up <70.

After having determined the input information for the clustering determination, a model for data clustering is determined, the space which is defined by each data descriptor. Within the evaluation the data descriptor-space is transformed in attempts to fulfill the constraints as much as possible.

This way a transformed cluster-space will be formed which facilitates the testing phase decision.

From a performance point of view it is of importance to put as little complexity in the testing stage as possible. Constraints that facilitate the testing phase are hence formed during the training phase.

Figure 5:
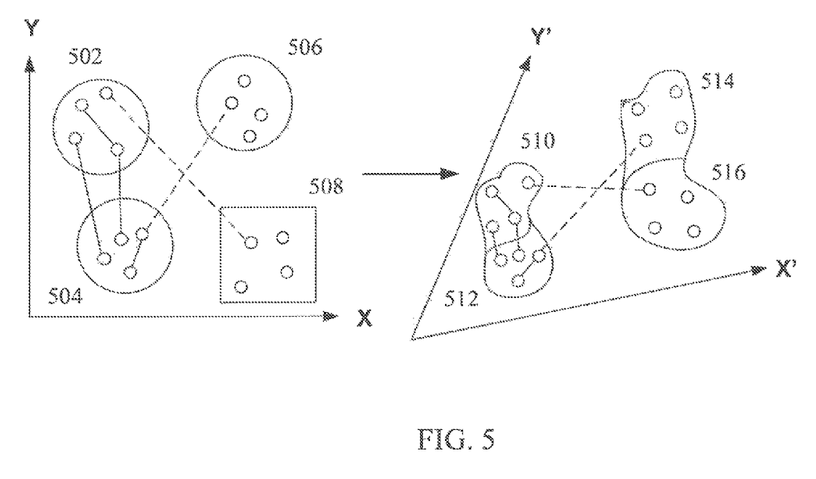
FIG. 5 schematically illustrates representations of data samples related to the present disclosure.

FIG. 5 schematically presents data samples of data traffic in different space dimensions. In the left hand panel one representation is shown in which data traffic having the same categories are spaced apart in the two-dimensional X-Y space, as presented. Denoted by 502 and 504 are for instance data samples of data traffic P2P, and denoted with 506 and 508 are for instance data samples of data traffic hyper text transfer protocol.

In the right-hand panel another representation of data samples is presented, in which data traffic having the same categories are closer in space in the transformed two-dimensional X'-Y' space. Data samples of P2P are denoted by 510 and 512, and data samples of hyper text transfer protocol are denoted by 514 and 516.

It is illustrated that the data samples of 510 and 512 are better categorized in the right-hand panel of FIG. 5, as compared to data samples of 502 and 504 in the left-hand panel. Data traffic profiling is thus more accurate in the right-hand panel, than in the left-hand panel.

Figure 6:
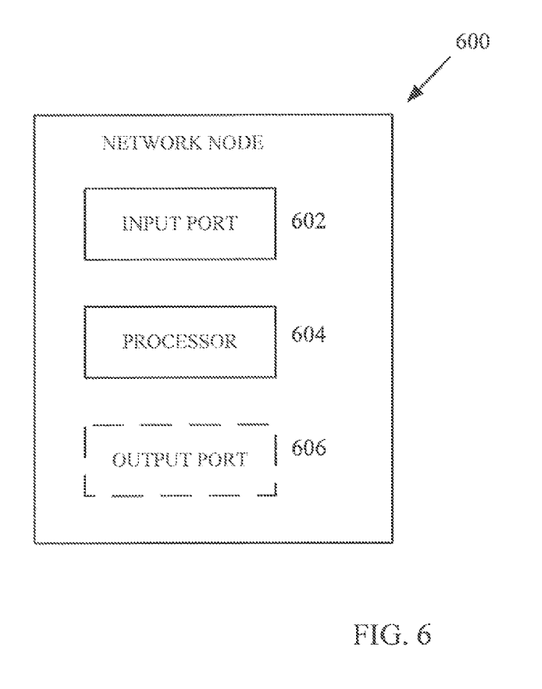
FIG. 6 schematically presents a network node according to the present disclosure.

FIG. 6 schematically presents a network node 600 for determining input information for creation of a data traffic clustering model for data traffic passing via said network node. The data traffic comprises data flows where the categories of said data flows are known. The network node comprises an input port 602 that is configured to obtain flow information of said data flows, and a processor 604 that is configured to obtain data descriptors of said data flows, where said data descriptors describe data of said data descriptors. Moreover, the processor 604 is further configured to determine clustering model input information based on said obtained data descriptors of said data flows and said obtained flow information of said data flows. In addition, the processor is also configured to determine clustering model input information by 1) determining constraints on data samples from data flows with the same categories, and/or 2) selecting a subset of said data descriptors by calculating values of required bandwidths of various processing resources for calculation of said data descriptors, and calculation of values of content information of the respective data descriptor of each data flow, and comparing these values with bandwidth and content information thresholds, respectively.

The input port 602 of the network node 600 may be further configured to obtain port-related and/or IP address-related flow information of said data flows.

The processor 604 of the network node 600 may be further configured to determine constraints on data samples of at least one of:

1) data flows that originate from different source IP addresses and are destined for the same destination IP address;
2) data flows that originate from the same source IP address and the same source port of said IP address; and
3) data flows with different flow information but with the same source IP address.

The processor 604 of the network node may be further configured to select the subset of said data descriptors based on the content information comparison, enabling an optimized clustering model accuracy.

The processor 604 of the network node 600 may be configured to select the subset of said data descriptors based on the bandwidth comparison, enabling an optimized data profiling processing performance.

The network node 600 may further comprise an output port 606 that is configured to provide the determined input information from the processor 604, for creation of a data traffic clustering model.

The network node 600 may be further configured to observe network traffic of several users. The network node may be a base station, for instance a radio base station. The network node may be a serving general packet radio service support node, and/or a gateway general packet radio service support node, in a 3G network. Alternatively, the network node may be a broadband remote access server, and/or a digital subscriber line access multiplexer in a digital subscriber line network. Yet another alternative for the network node may be a wireless local access network aggregation point.

The present disclosure comprises a number of advantages of which some are included below.

A major advantage of the present disclosure is that it allows traffic clustering solely based on packet header information. This means that the present disclosure is appropriate to handle encrypted traffic.

Embodiments of the present disclosure provide several traffic clustering alternatives, which are provided to improve the accuracy of packet clustering methods that are based on packet headers.

It is advantageous to select data descriptors with low processing requirements, since such a selection enables real-time clustering of data traffic.

It is also an advantage that expert or detailed traffic knowledge may easily be used and incorporated into the present disclosure.

It must be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method in a network node for determining input information for creation of a data traffic clustering model, wherein data traffic via the network node comprises a plurality of user data flows of known data categories, the method comprising:
   obtaining data descriptors of the data flows, wherein the data descriptors describe physical parameters of the data flows;
   obtaining flow information of the data flows; and
   determining clustering model input information based on the obtained data descriptors and the obtained flow information, wherein the determining comprises at least one of:
      determining constraints on data samples from data flows with the same categories, wherein the constraints are determined on data samples of at least one of:
         data flows that originate from different source IP addresses and are destined for a same destination IP address;
         data flows that originate from a same source IP address and a same source port of the IP address; and
         data flows with different flow information but with a same source IP address; and
      selecting a subset of the data descriptors by:
         calculating values of required bandwidths of various processing resources for calculation of the data descriptors, and calculating values of content information of a respective data descriptor of each data flow;
         comparing the values of required bandwidths and the values of content information with bandwidth and content information thresholds, respectively; and
         selecting the subset of the data descriptors based on the comparing; and
      transmitting data indicative of the clustering model input information to another network node for creation of a data traffic clustering model based on the clustering model input information.

2. The method of claim 1, wherein the flow information of the data flows comprises port-related flow information, IP address-related flow information, or both, of the data flows.

3. The method of claim 1, wherein constraints determined between data samples from data flows with the same data categories comprise information obtained from deep packet inspection of the data flows.

4. The method of claim 1, wherein the constraints determined between data samples from data flows with the same data categories comprise data descriptors of the data flows.

5. The method of claim 1, wherein the selection of the subset of the data descriptors is based on the comparing of the content information, enabling an optimized clustering model accuracy.

6. The method of claim 1, wherein the selection of the subset of the data descriptors is based on the comparing of the required bandwidths, enabling an optimized data profiling processing performance.

7. The method of claim 1, wherein determining clustering model input information comprises determining user activity information based on user input for defining clusters.

8. A network node for determining input information for creation of a data traffic clustering model for data traffic passing via the network node, where the data traffic comprises data flows of known data categories, the network node comprising:

an input port configured to:
 obtain data descriptors of the data flows, wherein the data descriptors comprise physical parameters of the data flows; and
 obtain flow information of the data flows; and
a processing circuit configured to determine clustering model input information based on the obtained data descriptors of the data flows and based on the obtained flow information of the data flows from the input port, and further configured to perform at least one of:
 determining constraints on data samples from data flows with the same categories, wherein the constraints are determined on data samples of at least one of:
  data flows that originate from different source IP addresses and are destined for a same destination IP address;
  data flows that originate from a same source IP address and a same source port of the IP address; and
  data flows with different flow information but with a same source IP address; and
 selecting a subset of the data descriptors by:
  calculating values of required bandwidths of various processing resources for calculation of the data descriptors, and calculating
  values of content information of a respective data descriptor of each data flow;
  comparing the values of required bandwidths and the values of content information with bandwidth and content information thresholds, respectively; and
  selecting the subset of the data descriptors based on the comparing; and
 an output port configured to transmit data indicative of the clustering model input information to another network node for creation of a data traffic clustering model based on the clustering model input information.

9. The network node of claim 8, wherein the input port is further configured to obtain port-related flow information, IP address-related flow information, or both, of the data flows.

10. The network node of claim 8, wherein the processing circuit is configured to select the subset of the data descriptors based on the comparing of the content information, enabling an optimized clustering model accuracy.

11. The network node of claim 8, wherein the processing circuit is configured to select the subset of the data descriptors based on the comparing of the required bandwidths, enabling an optimized data profiling processing performance.

12. The network node of claim 8, wherein the network node is any one of a base station, a serving general packet radio service support node, a gateway general packet radio service support node, a broadband remote access server, and a digital subscriber line access multiplexer.

* * * * *